(12) United States Patent  
Bartolomeo et al.

(10) Patent No.: US 8,439,631 B2
(45) Date of Patent: May 14, 2013

(54) SHAFT COUPLING ARRANGEMENT

(75) Inventors: Mark E. Bartolomeo, Brownsburg, IN (US); Gregory Blake, Noblesville, IN (US); Randal L. Renback, Pittsboro, IN (US); Tony R. McKenney, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1410 days.

(21) Appl. No.: 12/205,425

(22) Filed: Sep. 5, 2008

(65) Prior Publication Data

US 2010/0061839 A1 Mar. 11, 2010

(51) Int. Cl.
*F01D 15/12* (2006.01)

(52) U.S. Cl.
USPC .................. 415/122.1; 415/124.1; 416/170 R

(58) Field of Classification Search ............... 415/122.1, 415/124.1; 416/70 R
See application file for complete search history.

(56) References Cited

U.S. PATENT DOCUMENTS

| | | | |
|---|---|---|---|
| 2,144,307 A * | 1/1939 | Hallden .................... 475/218 |
| 2,896,475 A * | 7/1959 | Garnier ..................... 74/665 Q |
| 3,022,675 A * | 2/1962 | Trought ..................... 74/385 |
| 3,611,834 A | 10/1971 | Dison | |
| 3,673,802 A | 7/1972 | Krebs et al. | |
| 4,251,987 A | 2/1981 | Adamson | |
| 4,739,678 A * | 4/1988 | Miura et al. .................. 74/665 T |
| 5,010,729 A | 4/1991 | Adamson et al. | |
| 6,183,388 B1 | 2/2001 | Hawkins | |
| 6,735,954 B2 | 5/2004 | Macfarlane et al. | |
| 6,855,089 B2 | 2/2005 | Poulin et al. | |
| 6,895,741 B2 | 5/2005 | Rago et al. | |
| 7,055,303 B2 | 6/2006 | MacFarlane et al. | |
| 7,055,330 B2 | 6/2006 | Miller | |
| 7,107,756 B2 | 9/2006 | Rolt | |
| 7,223,197 B2 | 5/2007 | Poulin et al. | |

* cited by examiner

*Primary Examiner* — Ajay K Arora
(74) *Attorney, Agent, or Firm* — Krieg DeVault LLP

(57) ABSTRACT

A shaft coupling arrangement and a corresponding method for coupling shafts are disclosed herein. The shaft coupling arrangement includes an input shaft operable to rotate about a first axis. The shaft coupling arrangement also includes an output shaft operable to rotate about a second axis. The shaft coupling arrangement also includes a gearing arrangement operable to engage the input and output shafts together for rotation in the same angular direction at different angular speeds. In one embodiment of the invention, the gearing arrangement includes a plurality of nested bevel gears. In another embodiment of the invention, the gearing arrangement can include a single layshaft.

20 Claims, 2 Drawing Sheets

SHAFT COUPLING ARRANGEMENT

STATEMENT REGARDING FEDERALLY SPONSORED RESEARCH OR DEVELOPMENT

The present invention was made under U.S. Government Contract Number F33615-03-D-2357 awarded by the Department of Defense, and the U.S. Government may have certain rights in the present invention.

BACKGROUND OF THE INVENTION

1. Field of the Invention

The invention relates to an arrangement for transmitting rotation between an input shaft and an output shaft.

2. Description of Related Prior Art

U.S. Pat. No. 7,055,303 discloses one example of transmitting rotation between an input shaft and an output shaft. With reference to FIG. 2 of the '303 patent, an input shaft (36) includes a bevel gear (45) that meshes with a bevel gear (47) mounted on a tower shaft (41). The tower shaft 41 is coupled to another intermediate shaft (51) through a bevel gear set (49). The input shaft (51) engages a reduction gear train (55) and the reduction gear train (55) drives an output shaft (53).

SUMMARY OF THE INVENTION

In summary, the invention is a shaft coupling arrangement and a corresponding method for coupling shafts. The shaft coupling arrangement includes an input shaft operable to rotate about a first axis. The shaft coupling arrangement also includes an output shaft operable to rotate about a second axis. The shaft coupling arrangement also includes a gearing arrangement operable to engage the input and output shafts together for rotation in the same angular direction at different angular speeds. In one embodiment of the invention, the gearing arrangement includes a plurality of nested bevel gears. In another embodiment of the invention, the gearing arrangement can include a single layshaft.

BRIEF DESCRIPTION OF THE DRAWINGS

Advantages of the present invention will be readily appreciated as the same becomes better understood by reference to the following detailed description of at least one exemplary embodiment when considered in connection with the accompanying drawings wherein.

DETAILED DESCRIPTION OF EXEMPLARY EMBODIMENTS

Figure 1:
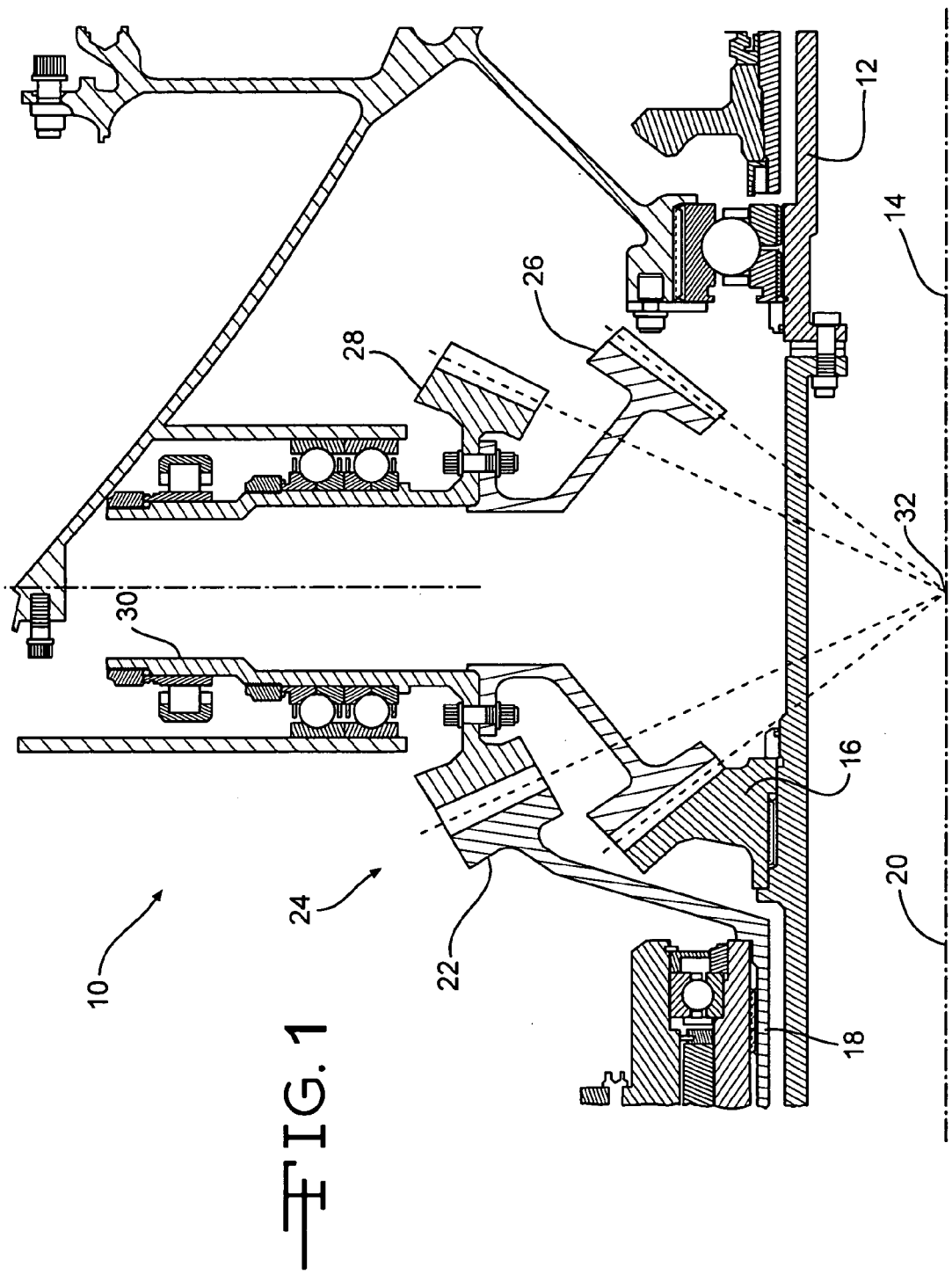
FIG. 1 is a cross-sectional view of a first embodiment of the invention.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The exemplary embodiments of the invention provide a shaft coupling arrangement that can minimize the number of parts required to couple two shafts together and can also minimize the envelope size of the structures applied to couple two shafts together. These benefits are enjoyed over planetary systems and spur gear systems. The exemplary embodiments apply nested bevel gears and a single layshaft to transmit power from an input shaft to rotate an output shaft in the same direction but at a different speed.

The exemplary embodiments are applied in a turbine engine, but alternative embodiments of the invention can be practiced to provide the same benefits in different operating environments. Furthermore, benefits derived or perceived from the application of the exemplary embodiments of the invention may not be realized in all operating environments for all embodiments of the invention. It is also noted that the benefits articulated herein are not exhaustive; other benefits may be perceived in the practice of the exemplary embodiments or in the practice of alternative embodiments of the invention. The benefits associated with the exemplary embodiment and described herein are not limitations of the broader invention, but rather demonstrate industrial applicability.

FIG. 1 shows a first exemplary embodiment of the invention. A shaft coupling arrangement 10 includes an input shaft 12 operable to rotate about a first axis 14. In the first exemplary embodiment of the invention, the input shaft 12 can be a low pressure shaft and the axis 14 of rotation can be the centerline axis of a turbine engine. In alternative embodiments of the invention, the input shaft could be other shafts, such as a high pressure shaft, a tower shaft, a fan shaft or any other shaft. The first exemplary embodiment of the invention can also include a first bevel gear 16 engaged with the low pressure shaft 12 for rotation about the centerline axis 14.

The shaft coupling arrangement 10 also includes an output shaft 18 operable to rotate about a second axis 20. In the first exemplary embodiment of the invention, the output shaft 18 can be a fan shaft and the second axis 20 of rotation can be collinear with the centerline axis 14 of the turbine engine. In alternative embodiments of the invention, the axes 14 and 20 can be spaced and parallel to one another or can be at an angle to one another, normal or oblique. A second bevel gear 22 can be fixed to the fan shaft 18 for rotation about the second axis 20.

In the first exemplary embodiment of the invention, the input shaft 12 and the first bevel gear 16 are separately-formed components connected together and that the output shaft 28 and the second bevel gear 16 are integrally-formed. However, the invention is not limited to this arrangement. The input shaft 12 and the first bevel gear 16 could be integrally-formed with respect to one another and/or the output shaft 18 and the second bevel gear 22 could be separately-formed components connected together.

The first and second bevel gears 16, 22 are components of an exemplary gearing arrangement 24 operable to engage the input and output shafts 12, 18 together for rotation in the same angular direction at different angular speeds. The exemplary gearing arrangement 24 can also include a plurality of nested bevel gears 26, 28 supported on a layshaft 30. The nested configuration of the bevel gears 26, 28 allows the envelope size of the exemplary coupling arrangement 10 to be minimized compared to planetary coupling arrangements and multiple layshaft arrangements. Also, the exemplary embodiment can represent a minimum number of components for a coupling arrangement compared to planetary coupling arrangements and multiple layshaft arrangements.

In operation, the input shaft 12 can be rotated about the axis 14 of rotation in a first angular direction and at a first angular velocity. The gearing arrangement 24 can transmit torque from the input shaft 12 to the output shaft 18 to rotate the output shaft 18 in the first angular direction at a second angular velocity less than the first angular velocity. For example, the bevel gear 16 can mesh with and drive the bevel gear 26 to rotate. The bevel gears 26 and 28 are fixed together for rotation and the therefore the bevel gear 28 rotates when the bevel gear 16 drives the bevel gear 26. The bevel gear 28 drives the bevel gear 22. The bevel gear 22 is fixed for rotation with the output shaft 18 and therefore the output shaft 18 rotates in response to rotation of the bevel gear 22.

The first exemplary embodiment of the invention can be practiced in numerous alternative embodiments. The exemplary layshaft 30 is substantially normal to the first and second axes 14, 20, but could be substantially normal to only one of the axes 14, 20 or neither of the axes 14, 20. Embodiments of the invention can be practiced in which the layshaft is parallel to one or both of the input and output shafts. The exemplary gearing arrangement 24 results in the output shaft 18 rotating at a lesser speed than the input shaft 12, but could be configured differently such that the output shaft 18 rotates at a greater speed than the input shaft 12.

The exemplary bevel gears 16, 22, 26, 28 include spiral teeth to provide a relatively high contact ratio and tooth overlap. However, the invention can be practiced in embodiments with bevel gears having straight teeth. Also, the exemplary bevel gears 16, 22, 26, 28 are disposed in a non-hypoid arrangement relative to one another, sharing a common pitch apex 32. However, the invention can be practiced in embodiments with bevel gears disposed in a hypoid gear arrangement.

Figure 2:
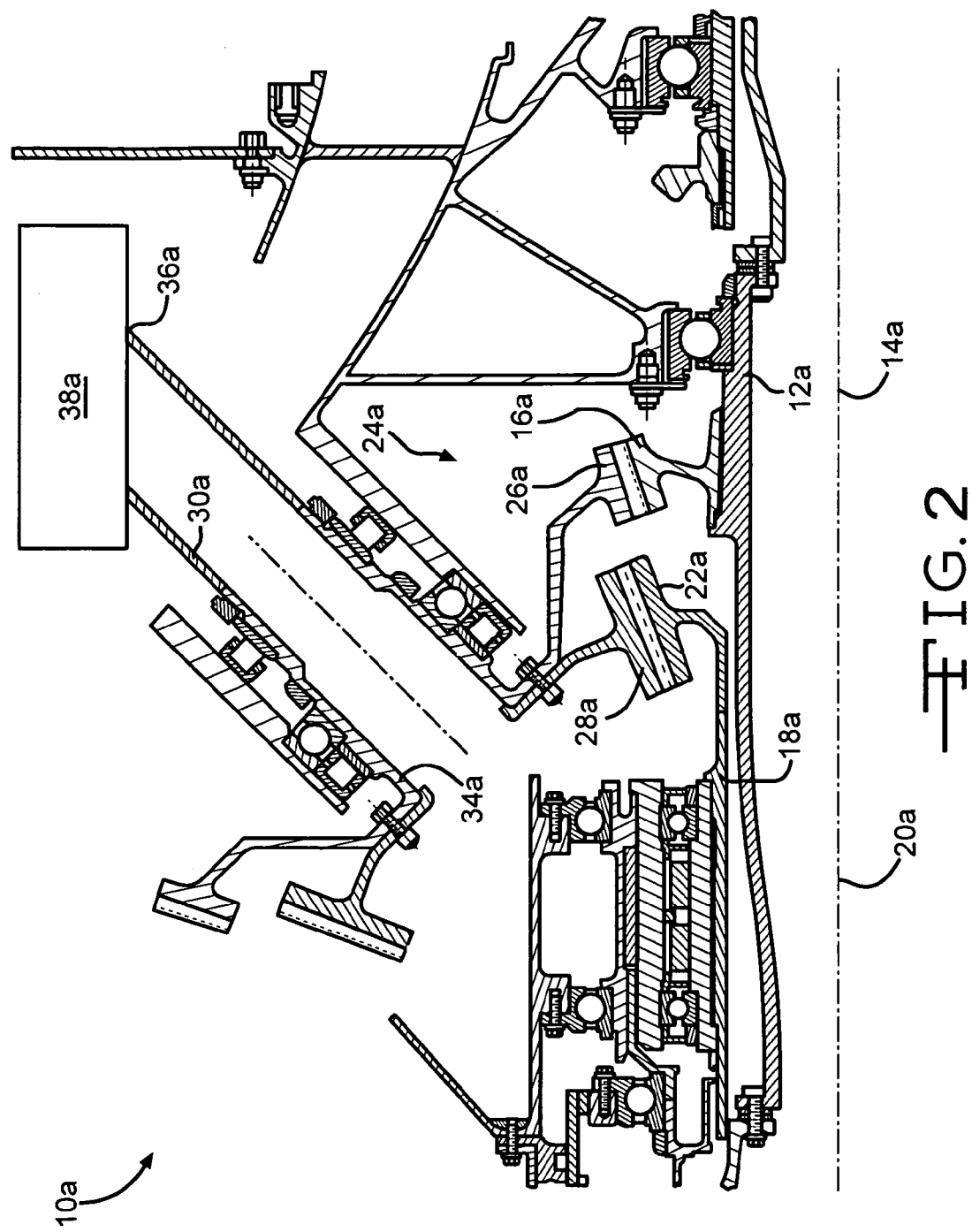
FIG. 2 is a cross-sectional view of a second embodiment of the invention.

FIG. 2 shows a second exemplary embodiment of the invention. A shaft coupling arrangement 10a includes an input shaft 12a operable to rotate about a first axis 14a. A first bevel gear 16a can be engaged with the input shaft 12a for rotation about the axis 14a of rotation. An output shaft 18a can be operable to rotate about a second axis 20a. In the second exemplary embodiment of the invention, the axes 14a and 20a can be collinear. A second bevel gear 22a can be fixed to the output shaft 18a for rotation about the second axis 20a.

The bevel gears 16a, 22a are components of an exemplary gearing arrangement 24a operable to engage the input and output shafts 12a, 18a together for rotation in the same angular direction at different angular speeds. The exemplary gearing arrangement 24a can also include a plurality of nested bevel gears 26a, 28a supported on a layshaft 30a. In the second exemplary embodiment of the invention, the layshaft 30a is oblique to both the first and second axes 14a, 20a.

The exemplary layshaft 30a extends between first and second opposite ends 34a, 36a and the bevel gears 26a, 28a are both positioned at the first end 34a. At the second end 36a, the layshaft 30a can deliver power to an accessory gear box 38a. The accessory gear box 38a can in turn supply power to generators, pumps, air/lubricant separators, or any other accessory to a turbine engine.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Also, while this document may draw attention to certain features believed to be of particular importance, it should be understood that the Applicant claims protection in respect of any patentable feature or combination of features hereinbefore referred to and/ or shown in the drawings whether or not particular emphasis has been placed thereon.

What is claimed is:

1. A shaft coupling arrangement comprising:
   an input shaft operable to rotate about a first axis;
   an output shaft operable to rotate about a second axis;
   a gearing arrangement operable to engage said input and output shafts together for rotation in the same angular direction at different angular speeds, wherein said gearing arrangement includes a plurality of nested bevel gears;
   a first bevel gear engaged to said input shaft for rotation about said first axis;
   a second bevel gear engaged to said output shaft for rotation about said second axis;
   a layshaft operable to rotate about a third axis; and
   third and fourth bevel gears fixed to said layshaft and encircling said third axis, wherein said third bevel gear is meshed with said first bevel gear and said fourth bevel gear is meshed with said second bevel gear such that rotation of said input shaft in a first angular direction at a first angular velocity results in rotation of said output shaft in the first angular direction at a second angular velocity different from said first angular velocity.

2. The shaft coupling arrangement of claim 1 wherein said first and second axes are substantially collinear.

3. The shaft coupling arrangement of claim 1 wherein said layshaft is substantially normal to at least one of said first and second axes.

4. The shaft coupling arrangement of claim 1 wherein said layshaft is substantially normal to both of said first and second axes.

5. The shaft coupling arrangement of claim 1 wherein said layshaft is oblique to at least one of said first and second axes.

6. The shaft coupling arrangement of claim 1 wherein said layshaft is oblique to both said first and second axes.

7. The shaft coupling arrangement of claim 1 further comprising:
   an accessory gear box engaged with said layshaft, wherein said layshaft supports said plurality of bevel gears at one end and transmits torque to said accessory gear box at a second end opposite said first end.

8. The shaft coupling arrangement of claim 1 wherein said plurality of bevel gears include spiral teeth.

9. The shaft coupling arrangement of claim 1 wherein said plurality of bevel gears are disposed in a non-hypoid arrangement relative to one another.

10. The shaft coupling arrangement of claim 1 wherein said fourth bevel gear is nested in said third bevel gear.

11. A method comprising the steps of:
    transmitting torque from an input shaft to an output shaft to rotate the output shaft in the same angular direction as the input shaft and to rotate the output shaft at an angular velocity different from an angular velocity of the input shaft; and
    engaging the input and output shafts together through a gearing arrangement having a plurality of bevel gears supported by a single layshaft, wherein the gearing arrangement includes:

a first bevel gear engaged to the input shaft for rotation about a first axis;

a second bevel gear engaged to the output shaft for rotation about a second axis;

the single layshaft operable to rotate about a third axis; and third and fourth bevel gears fixed to the layshaft and encircling the third axis, wherein the third bevel gear is meshed with the first bevel gear and the fourth bevel gear is meshed with the second bevel gear such that rotation of the input shaft in a first angular direction at a first angular velocity results in rotation of the output shaft in the first angular direction at a second angular velocity different from the first angular velocity.

12. The method of claim 11 wherein said engaging step further comprises the step of:

minimizing the envelope size of the gearing arrangement by arranging the third and forth bevel gears in a nested configuration.

13. The method of claim 11 wherein said engaging step further comprises the step of:

minimizing the number of components of the gearing arrangement to only four bevel gears and a single layshaft.

14. The method of claim 11 further comprising the step of:

transmitting power to an accessory gear box with the single layshaft of the gearing arrangement.

15. The method of claim 11 wherein the angular velocity of the output shaft is less than the angular velocity of the input shaft.

16. A turbine engine comprising:

a first shaft operable to rotate about a centerline axis;

a first bevel gear engaged with said first shaft for rotation about said centerline axis;

a second shaft operable to rotate about a second axis;

a second bevel gear fixed to said second shaft for rotation about said second axis;

a layshaft operable to rotate about a third axis; and third and fourth bevel gears fixed to said layshaft and encircling said third axis, wherein said third bevel gear is larger than said fourth bevel gear and is meshed with said first bevel gear and said fourth bevel gear is meshed with said second bevel gear such that rotation of said first shaft in a first angular direction at a first angular velocity results in rotation of said second shaft in the first angular direction at a second angular velocity less than the first angular velocity.

17. The turbine engine of claim 16 wherein said fourth bevel gear is nested in said third bevel gear.

18. The turbine engine of claim 16 wherein said layshaft extends between first and second opposite ends and said third and fourth bevel gears are both positioned at said first end.

19. The turbine engine of claim 18 further comprising:

an accessory gear box operable to receive power from said layshaft at a position spaced from said first end.

20. The turbine engine of claim 16 wherein all of said bevel gears share a common pitch apex.

* * * * *